(12) United States Patent
Ku

(10) Patent No.: US 6,752,266 B2
(45) Date of Patent: Jun. 22, 2004

(54) COMPACT DISC HOLDER

(75) Inventor: Chia-Chun Ku, Taipei (TW)

(73) Assignee: Sinta Technology Corp. (TW)

( * ) Notice: Subject to any disclaimer, the term of this patent is extended or adjusted under 35 U.S.C. 154(b) by 0 days.

(21) Appl. No.: 10/400,701

(22) Filed: Mar. 28, 2003

(65) Prior Publication Data

US 2003/0188978 A1 Oct. 9, 2003

(30) Foreign Application Priority Data

Apr. 3, 2002 (TW) ..................... 91204291 U

(51) Int. Cl.⁷ .............................................. B65D 85/57
(52) U.S. Cl. ................................. 206/308.1; 206/310
(58) Field of Search .................. 206/308.1, 309–312, 206/303, 493, 806

(56) References Cited

U.S. PATENT DOCUMENTS

| | | | |
|---|---|---|---|
| 4,722,439 A | * | 2/1988 | Grobecker et al. ...... 206/308.1 |
| 4,771,890 A | * | 9/1988 | Hofland et al. ......... 206/308.1 |
| 5,533,615 A | | 7/1996 | McCamy |
| 5,685,425 A | | 11/1997 | Choi |
| 5,845,771 A | | 12/1998 | Fu |
| 5,924,564 A | | 7/1999 | Lin |
| 5,938,020 A | | 8/1999 | Luckow |
| 6,283,285 B1 | | 9/2001 | Ikebe et al. |
| 6,405,859 B1 | * | 6/2002 | Ku ......................... 206/308.1 |
| 6,454,090 B1 | * | 9/2002 | Flores et al. ............ 206/308.1 |
| 6,554,132 B2 | * | 4/2003 | Lau ........................ 206/308.1 |
| 6,571,944 B2 | * | 6/2003 | Ku ......................... 206/308.1 |

* cited by examiner

Primary Examiner—Luan K. Bui
(74) Attorney, Agent, or Firm—Harness, Dickey & Pierce, P.L.C.

(57) ABSTRACT

A compact disc holder is made in one piece by integrated forming for holding and clipping a compact disc and providing a storage structure. The invention has a plate type holder body. One side of the holder body has a clip flange. Another side of the holder body opposite to the clip flange has a cantilever arm. The cantilever arm has a latch flap. The latch flap and the clip flange form a clipping zone. When the cantilever arm is still in a normal condition it may be moved horizontally relative to the holder body to expand the clipping zone to facilitate mounting or removing of the compact disc.

13 Claims, 16 Drawing Sheets

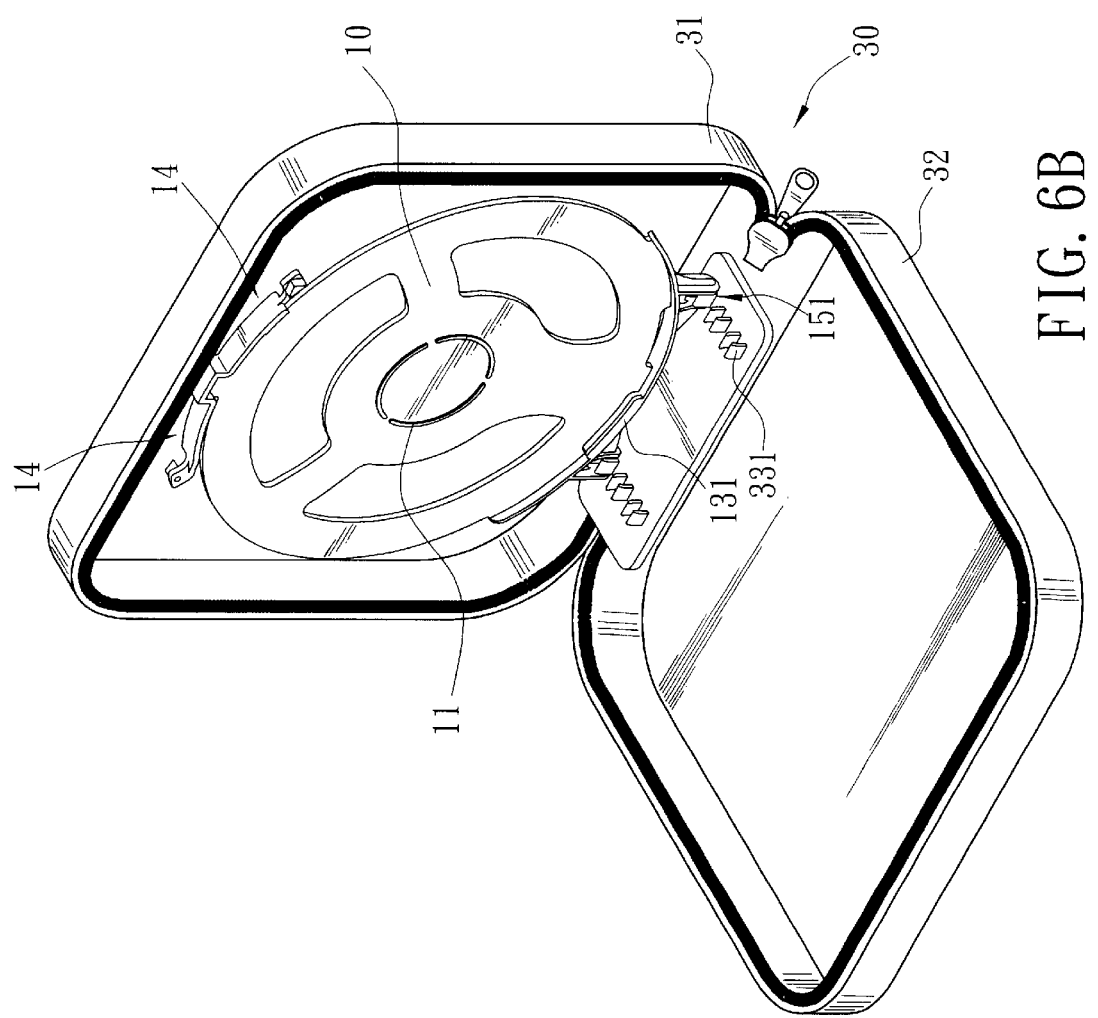

COMPACT DISC HOLDER

FIELD OF THE INVENTION

The invention relates to a compact disc (CD) holder for holding compact discs, and particularly to a CD holder that is made in one piece by integrated forming.

BACKGROUND OF THE INVENTION

CDs are widely used recording media for storing digitized data such as music, movies or software. The commonly used CD at present is a circular disc with a diameter about 120 mm. It has a center hole. Around the center hole there is a central useless area about 15 mm in diameter (?). The area beyond the central useless area is the data area. The outer peripheral rim of the disc further has a useless area about 1 mm in diameter (?). The finished product of the general CD (i.e. music disc or software disc) is encased in a CD cartridge to avoid scrapping or damage. The conventional CD cartridge generally consists of a base, a lid and a coupling dock. The base and the lid are respectively made from transparent plastics by injection forming to become two elements. The lid has one side pivotally engaged with the base to form a case that may be opened or closed. The coupling dock is located on the base for clipping the compact disc to prevent the back light area on the front side or the data area on the back side of the CD from scrapping or being damaged. In order to latch the CD without damaging the data area, the latch area is located on the central useless area of the CD. The coupling dock has a multi-claw chuck in the center. The multi-claw chuck is slightly elastic. When the center hole of the CD is positioned on the multi-claw chuck and depressed, the multi-claw chuck lightly presses the center hole of the CD so that the CD may be anchored on the CD cartridge.

In order to enable the CD to be held firmly on the multi-claw chuck, the multi-claw chuck must be made sturdily. Hence users have to apply a substantial force to mount or remove the CD. Such an operation tends to warp or even break the CD.

After consumers buy music discs or software discs, they generally store the disc in the original disc cartridge after use. Then the disc cartridge is placed on a CD rack. There are also CD containers to store a plurality of CDs and facilitate retrieval or searching. Such containers usually can house a plurality of CD holders. In order to facilitate fetching and storing, the CD holder generally does not have a multi-claw chuck. Instead, the CD holder has a coupling section on the periphery to hold the CD.

Many different types of CD cartridges or containers have been developed and disclosed. References can be found in U.S. Pat. Nos. 5,533,615, 5,685,425, 5,845,771, 5,924,564, 5,938,020, 6,283,285, etc.

For instance, U.S. Pat. No. 5,533,615 discloses a "DISC STORAGE CASE" which consists of a base, a lid and a coupling dock. It clips the CD on the peripheral rim rather than the center hole as the conventional techniques do. Hence its coupling dock does not have the multi-claw chuck. Instead, a movable depressing section is used. The depressing section has a front edge to press the peripheral rim of CD. Users may vertically depress the rear rim of the depressing section to move the front edge of the depressing section upwards so that the CD may be removed or stored. While it does not have the multi-claw chuck, it is still made in a cartridge form and has many elements. Production and assembly cost is higher.

Another example is U.S. Pat. No. 5,924,564 entitled "DISK STORAGE DEIVCE WITH SPRING ELEMENT". It also consists of at least three main elements including a base, a lid and a coupling dock. The coupling dock has a hook in the center and a spring on the bottom rim. To remove and mount the CD, a user has to grasp the periphery of the CD with one hand and hold the base with another hand to push the peripheral edge of the CD towards the spring and compress the spring so that the center hole of the CD may be latched on the hook to anchor the CD. It uses the central useless area of the CD for anchoring. Production processes are quite complicated and cost is higher.

SUMMARY OF THE INVENTION

The primary object of the invention is to provide a CD holder that is made in one piece by integrated forming for holding compact discs. It employs a design different from the conventional CD holding methods adopted in the prior art mentioned above.

The CD holder according to the invention includes a holder body, which has a clip flange on one side and a cantilever arm on another side opposite the clip flange. The cantilever arm has a latch flap. The latch flap and the clip flange form a clipping zone for holding the CD. When the cantilever arm is still in a normal condition it may be moved in the horizontal direction against the holder body to expand the clipping zone and allow the CD to be mounted or removed.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 6B is a schematic view of the fourth embodiment of the invention in use.

DESCRIPTION OF THE PREFERRED EMBODIMENTS

The CD holder of the invention aims at carrying and clipping a compact disc by employing a structure different from the conventional techniques that use CD cartridges, CD pouches or CD cases. The embodiments of the invention discussed below all use plastic injection forming techniques to make novel CD holders in an integrated fashion for containing CDs without additional assembly processes.

Figure 3B:
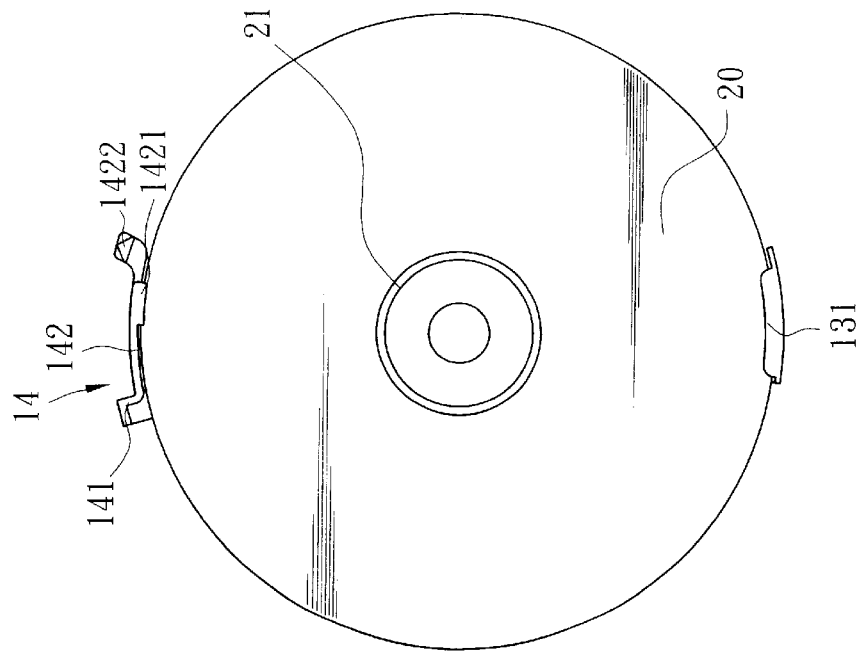
FIGS. 3A and 3B are schematic views of the first embodiment of the invention in operating conditions.
Figure 3A:
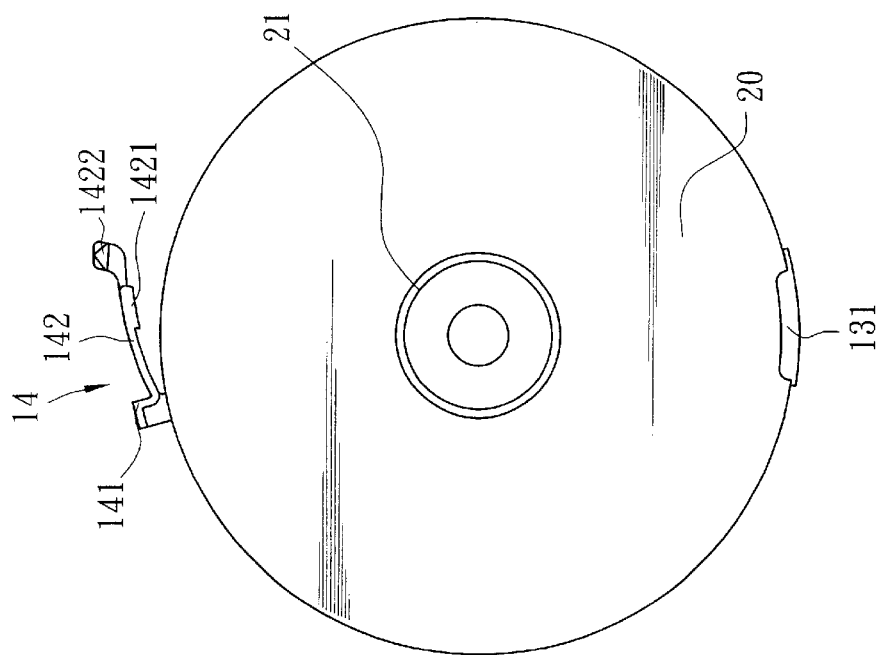

While a conventional CD 20 (as shown in FIG. 3A) is generally formed in a circular fashion, there are also CDs made in irregular forms. Whatever the shape of the CDs, they usually have a center hole 21 formed in the center for clipping and anchoring the CD 20. The invention provides a technique that clips the peripheral rim of the CD 20. The invention can be adopted for clipping circular CDs and other CDs of various geometric forms.

First Embodiment

Figure 1:
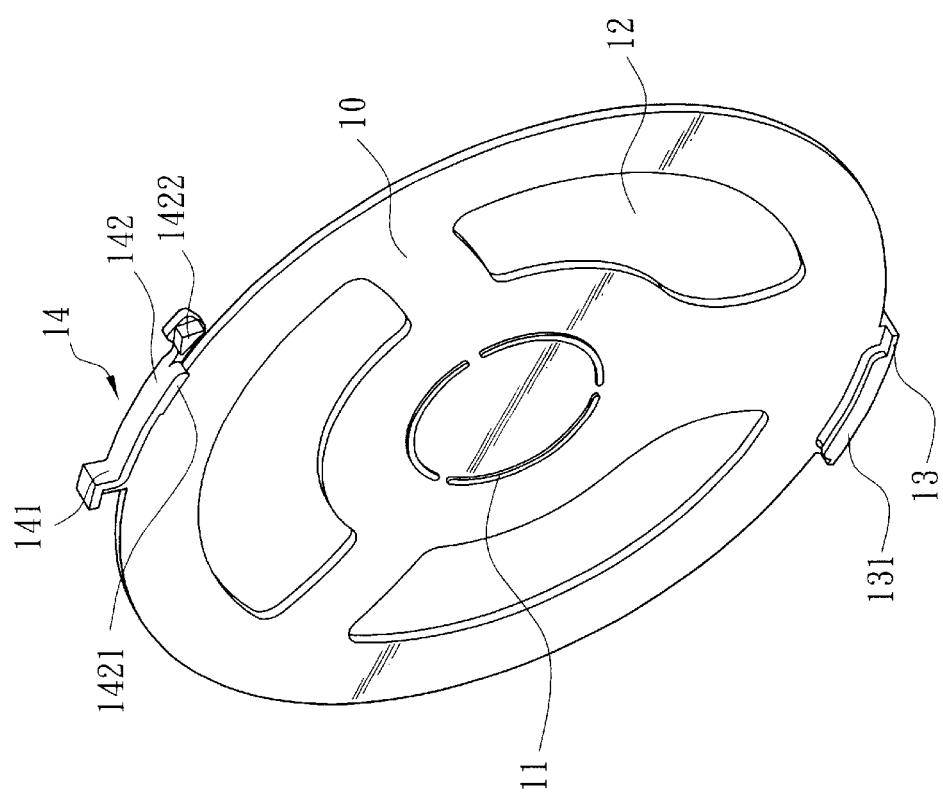
FIG. 1 is a perspective view of a first embodiment of the invention.
Figure 2:
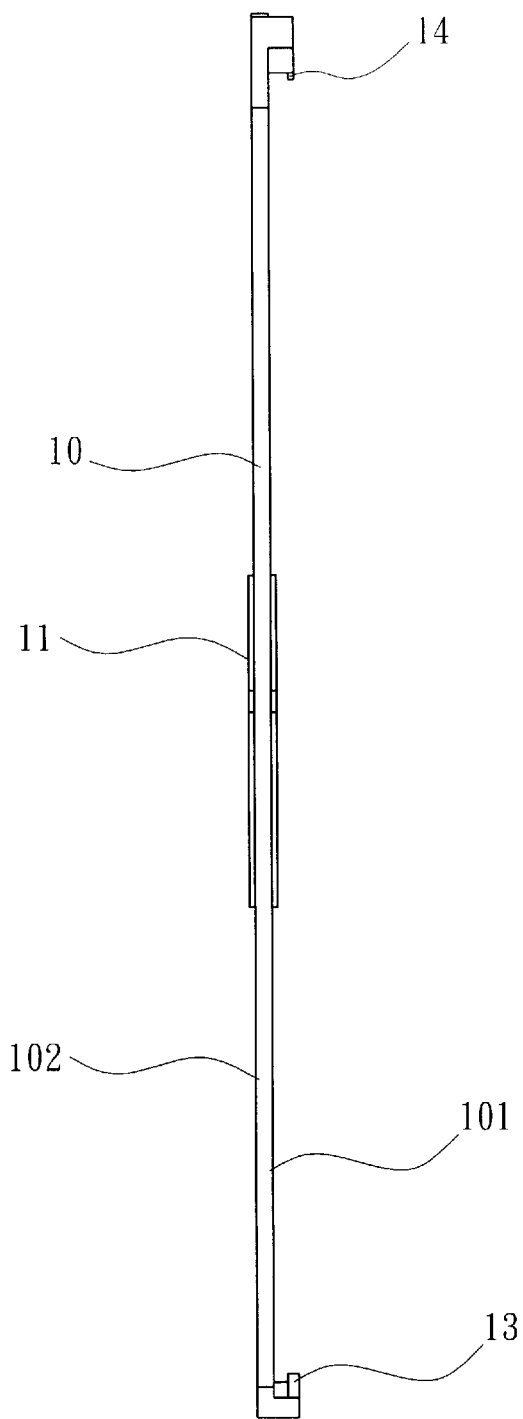
FIG. 2 is a side view of the first embodiment of the invention.

Referring to FIGS. 1 and 2, the CD holder of the invention includes a holder body 10, which is formed in a plate shape with a front planar side 101 and a back planar side 102. The CD is generally circular. The holder body 10 matches the form of the CD, which may be circular or other desired geometric shapes. The holder body 10 has a longitudinal length greater than the outer diameter of the CD. In the center of the holder body 10, there is a bulged section 11 which may be a continuous strip or consist of dot elements. When the CD 20 is mounted onto the holder body 10, the CD 20 may rest on the bulged section 11 and be spaced from the holder body 10 at a selected distance to prevent friction or scrapping between the holder body 10 and the surface of the CD 20.

The holder body 10 has a side wall 13 formed on one longitudinal side thereof. The side wall 13 is normal to the planar surface of the holder body 10 and extended to a selected height. The side wall 13 has a clip flange 131 extending horizontally towards the center of the holder body 10 and is parallel with the planar surface of the holder body 10. The clip flange 131 is spaced from the holder body 10 at a selected elevation slightly greater than the thickness of the CD 20 and can clip the outer rim of one side of the CD 20.

The holder body 10 further has a cantilever arm 14 located on another side opposite the clip flange 131. The cantilever arm 14 has one end forming a connecting section 141 that is connected to the holder body 10 and another end forming a suspending elastic section 142. Because of the properties of plastic, the elastic section 142 remains still in normal conditions. However, when the elastic section 142 is subject to a force, it may be moved slightly. When the force is released, the elastic section 142 returns to the still position in the normal conditions. The cantilever arm 14 is extended from one side of the holder body 10 to allow the elastic section 142 to be moved horizontally relative to the holder body 10. The elastic section 142 further has a latch flap 1421, which is spaced from the holder body 10 at an elevation slightly greater than the thickness of the CD 20 and movable horizontally towards the center of the holder body 10. The elastic section 142 has an outer side forming a poking flap 1422 to allow user's finger to move the elastic section 142. The latch flap 1421 and the clip flange 131 form a clipping zone for holding the outer peripheral rim of the CD 20 (i.e. the same as the diameter of the CD 20). Thus the elastic section 142 enables the latch flap 1421 to form a clip position on the clipping zone in normal conditions and to be extended to a release position under force to expand the clipping zone. On the clipping position, the latch flap 1421 and the clip flange 131 can clip and hold the CD 20, and anchor it on the holder body 10. On the release position, the clipping zone is expanded to allow the CD 20 to be mounted onto qor removed from the holder body 10.

Referring to FIGS. 3A and 3B, when loading the CD 20 on the CD holder, first, insert one side of the CD 20 in the clip flange 131 in a slightly biased manner. Next, move the poking flap 1422 with a finger to move the elastic section 142 and move the latch flap 1421 horizontally outwards to the release position to expand the clipping zone for mounting the CD 20 completely onto the holder body 10. Then release the elastic section 142 and it returns to the normal position. The latch flap 1421 clips another side of the CD 20. Thus the clip flange 131 and the latch flap 1421 jointly clip the outer rim of the CD 20 to anchor the CD 20 securely on the holder body 10.

Second Embodiment

Figure 4:
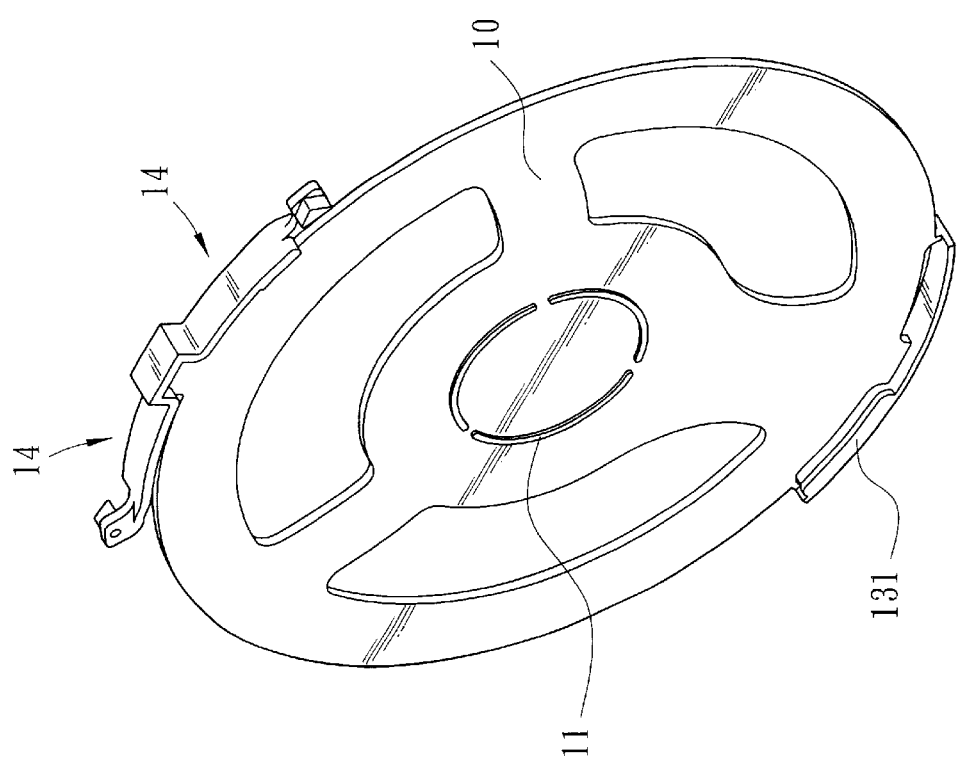
FIG. 4 is a perspective view of a second embodiment of the invention.

The CD holder of the first embodiment set forth above has a holder body 10 with one side for holding one CD 20. The second embodiment of the invention provides a CD holder for holding two CDs 20. As shown in FIG. 4, the holder body 10 has a pair of cantilever arms 14 and a pair of clip flanges 131. One set of cantilever arms 14 and clip flanges 131 are located on one side of the holder body 10 with the clip flange 131 and the latch flap 1421 spaced from the planar side at a selected elevation. Another set of cantilever arms 14 and clip flanges 131 are located on the opposite side of the holder body 10 with the clip flange 131 and the latch flap 1421 spaced from the opposite planar side at a selected elevation. These two sets of cantilever arms 14 and clip flanges 131 can respectively clip a CD 20 such that the positive planar side 101 and the back planar side 102 of the CD holder can hold two CDs 20 together.

More embodiments are explained as follows. They all adopt the design that has a pair of cantilever arms 14 and a pair of clip flanges 131 for holding two CDs 20.

Third Embodiment

Figure 5A:
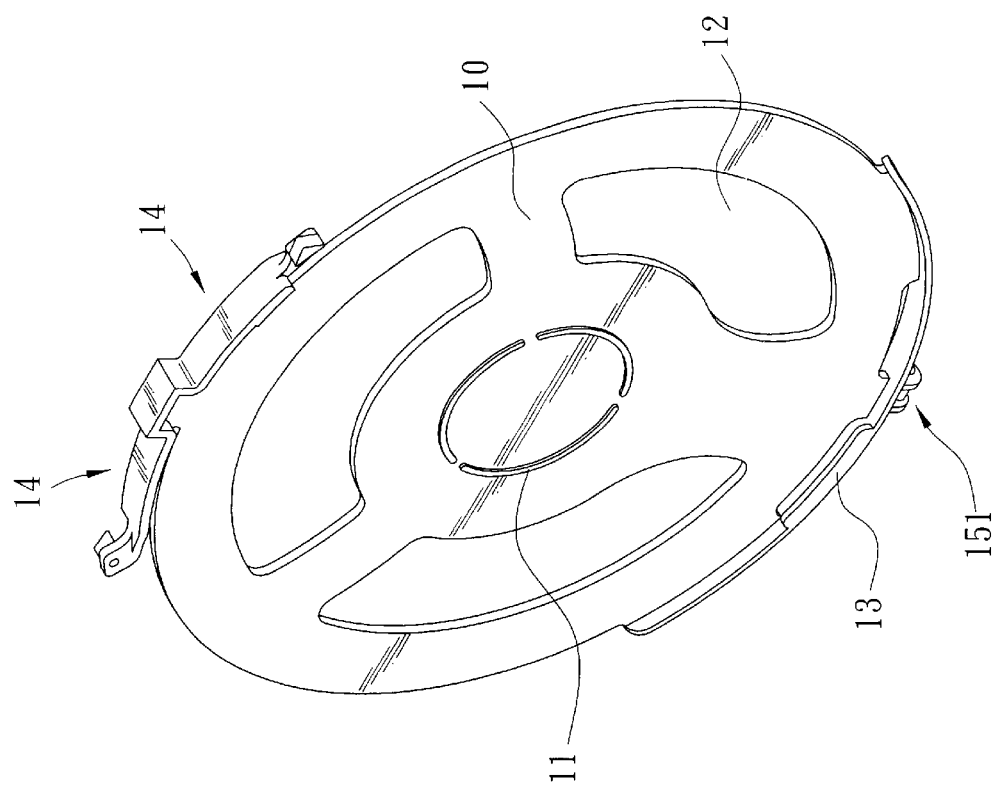
FIG. 5A is a perspective view of a third embodiment of the invention.
Figure 5B:
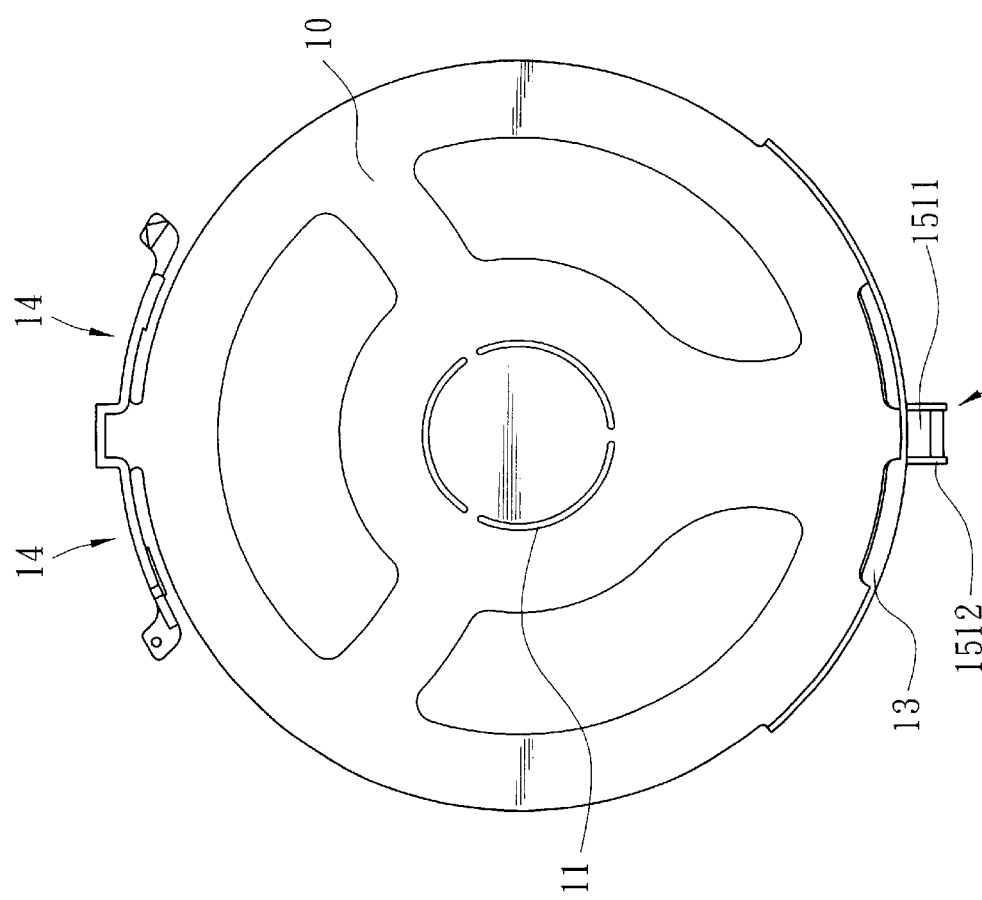
FIG. 5B is a front view of the third embodiment of the invention.

Refer to FIGS. 5A and 5B for a third embodiment of the invention. The holder body 10 has a coupling section 151 located on the outermost side of the side wall 13. The coupling section 151 has a notch 1511 and a latch bar 1512.

Figure 5C:
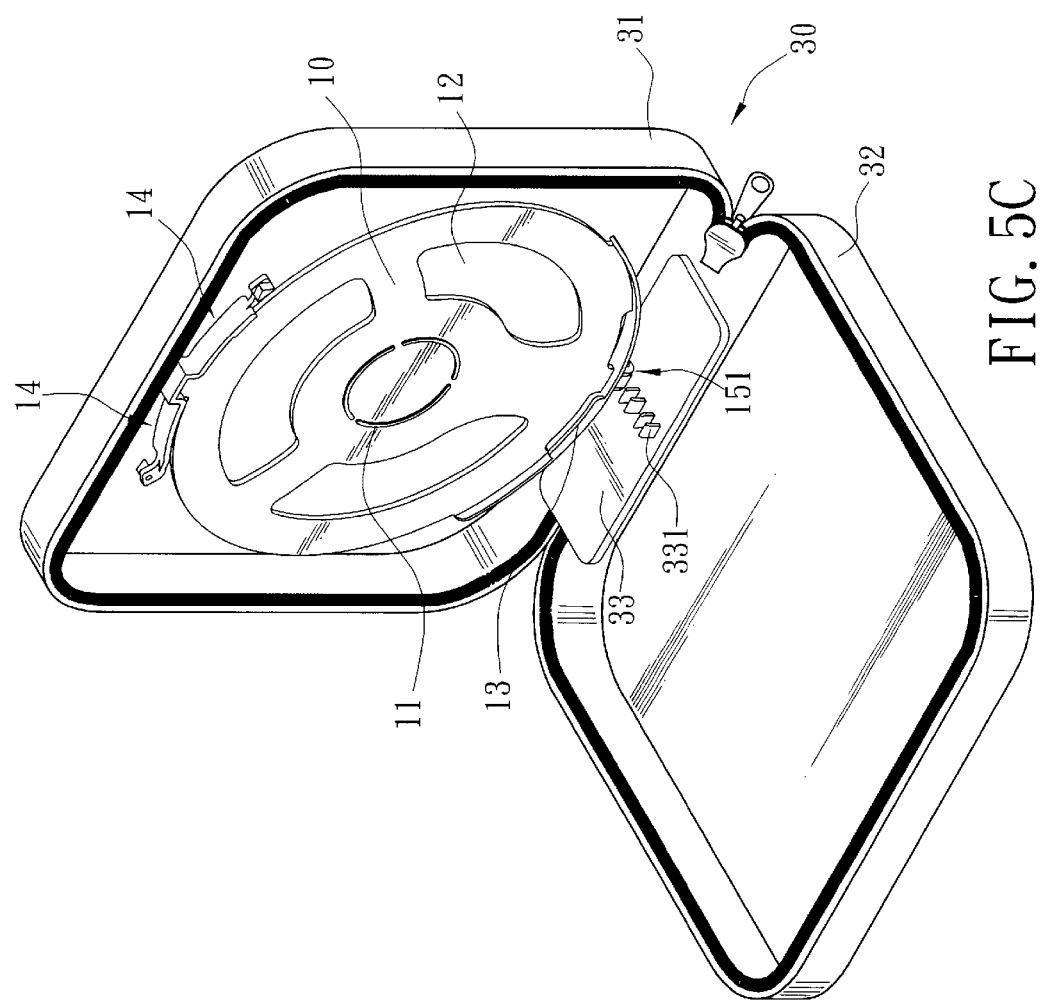
FIG. 5C is a schematic view of the third embodiment of the invention in use.

Referring to FIG. 5C, the latch section 151 is designed to enable the holder body 10 to be housed in a case 30. The case 30 includes an upper case 31 and a lower case 32 that are connected to each other and may be opened or closed. The upper case 31 and the lower case 32 are generally coupled and closed by means of zippers or the like (not shown in the drawings) to facilitate carrying of CDs. The upper case 31 and the lower case 32 have a juncture with a latch dock 33 located thereon. The latch dock 33 has a plurality of latch claws 331 corresponding to the coupling section 151. The latch bar 1512 of the latch section 151 may be depressed and coupled in the latch claws 331. Thus the holder body 10 may be mounted on the latch dock 33, and is turnable about the latch bar 1512 so that a plurality of holder bodies 10 may be held in the case 30. By means of such a turnable design, users can search and remove the required CD 20 conveniently. Of course, the holder body 10 may also be removed from the case 30 by separating the coupling section 151 from the latch claws 331 with force.

Fourth Embodiment

Figure 6A:
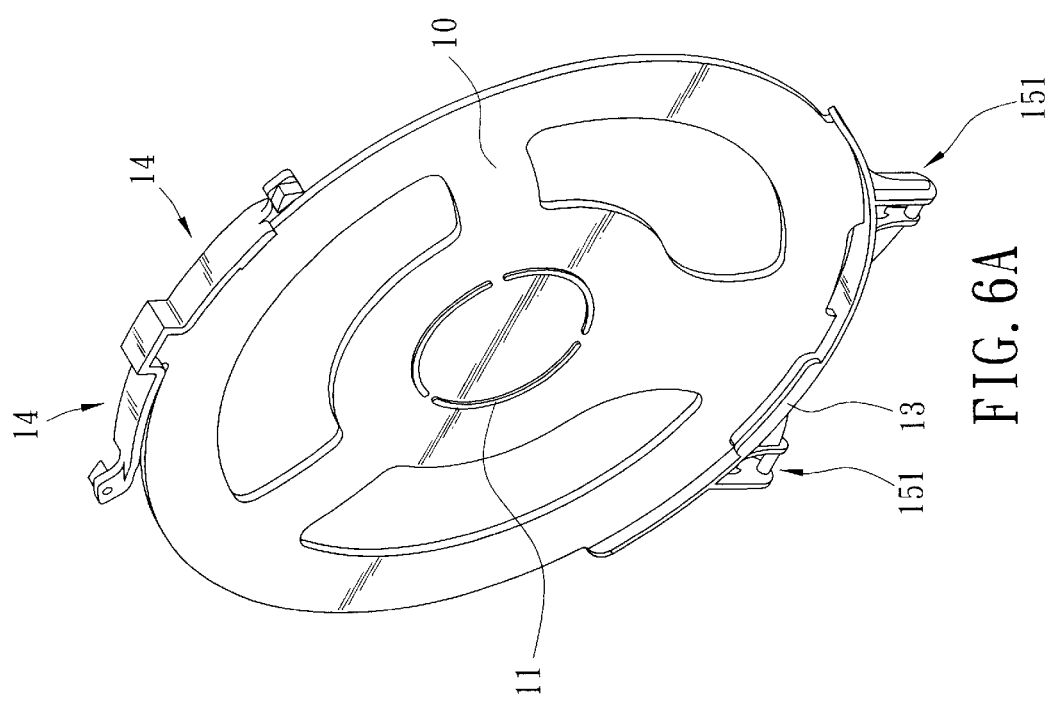
FIG. 6A is a perspective view of a fourth embodiment of the invention.

The third embodiment set forth above has only one coupling section 151. Referring to FIGS. 6A and 6B, the fourth embodiment of the invention has two sets of coupling sections 151. The latch claws 331 of the latch dock 33 also are formed in pairs to correspond to the latch sections 151. Such a design enables the holder body 10 to be held securely in the case 30.

Fifth Embodiment

Figure 7A:
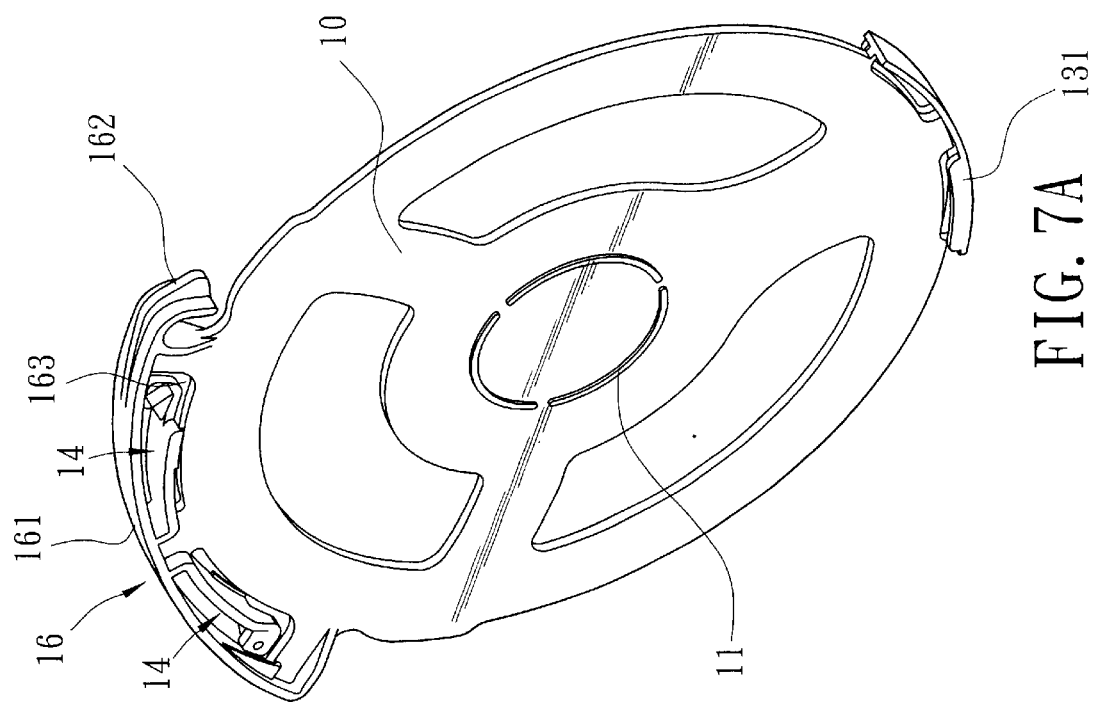
FIG. 7A is a perspective view of a fifth embodiment of the invention.

Refer to FIG. 7A for a fifth embodiment of the invention. On the outmost side of the cantilever arm 14 of the holder body 10, there is a fender 16, which has a flat surface 161 on the outer side for bonding a label (not shown in the drawing) to indicate the content of the CD 20 so that users can recognize the required CD quickly. There is a carved opening 163 between the fender 16 and the holder body 10 to form a maximum movable space for the elastic section 142 so that the elastic section 142 may be prevented from deforming excessively and fracturing. The fender 16 further has a hook 162 on the outer side to allow the holder body 10 to be hung on a rod 42 (as shown in FIGS. 7B and 7C).

Figure 7B:
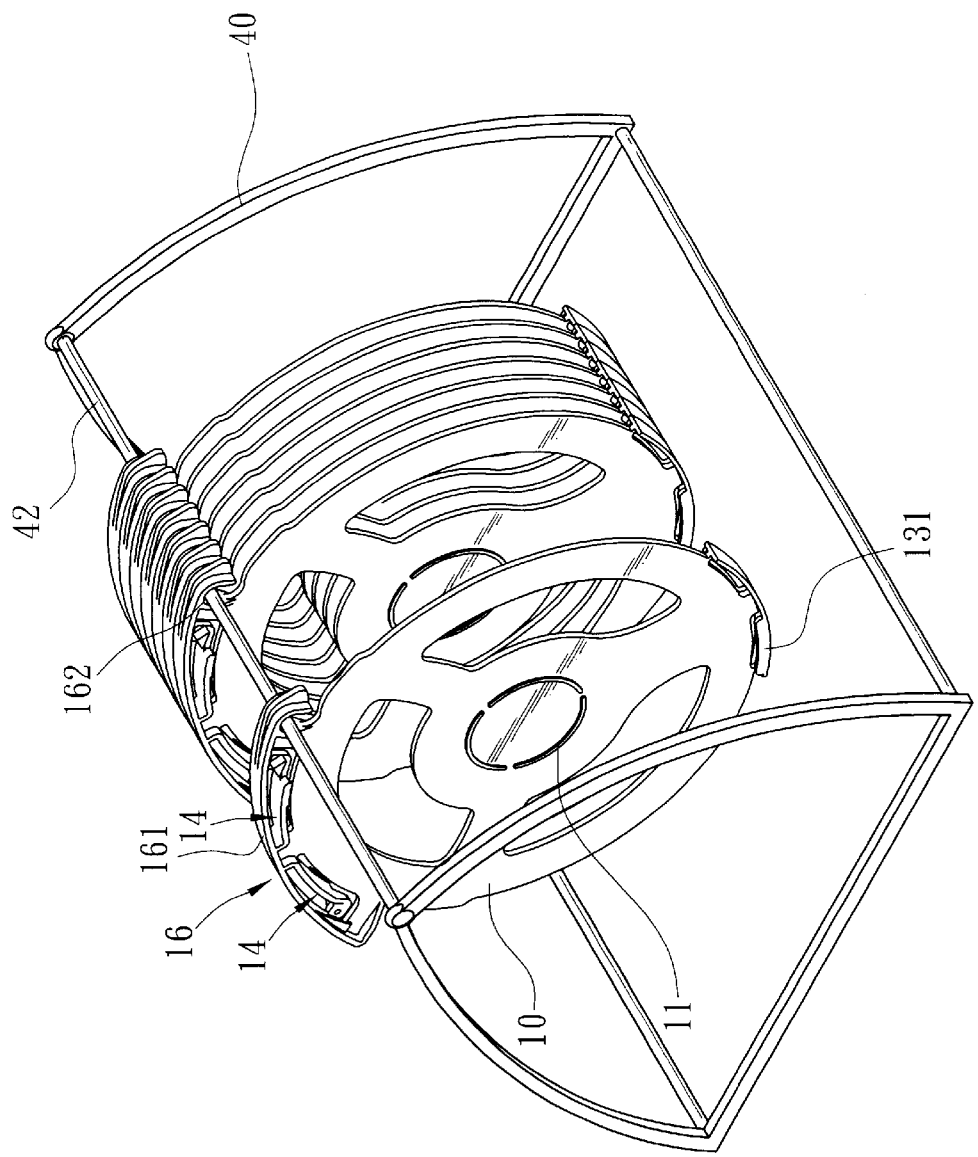
FIG. 7B is a schematic view of the fifth embodiment of the invention in use.

Refer to FIG. 7B for an example of the fifth embodiment in practical use. An open type holding rack 40 is provided. The holding rack 40 has a rod 42 located at a higher elevation. The holder body 10 may be hung on the rod 42 through the hook 162. It becomes a hanging storage means for the CD 20.

Figure 7C:
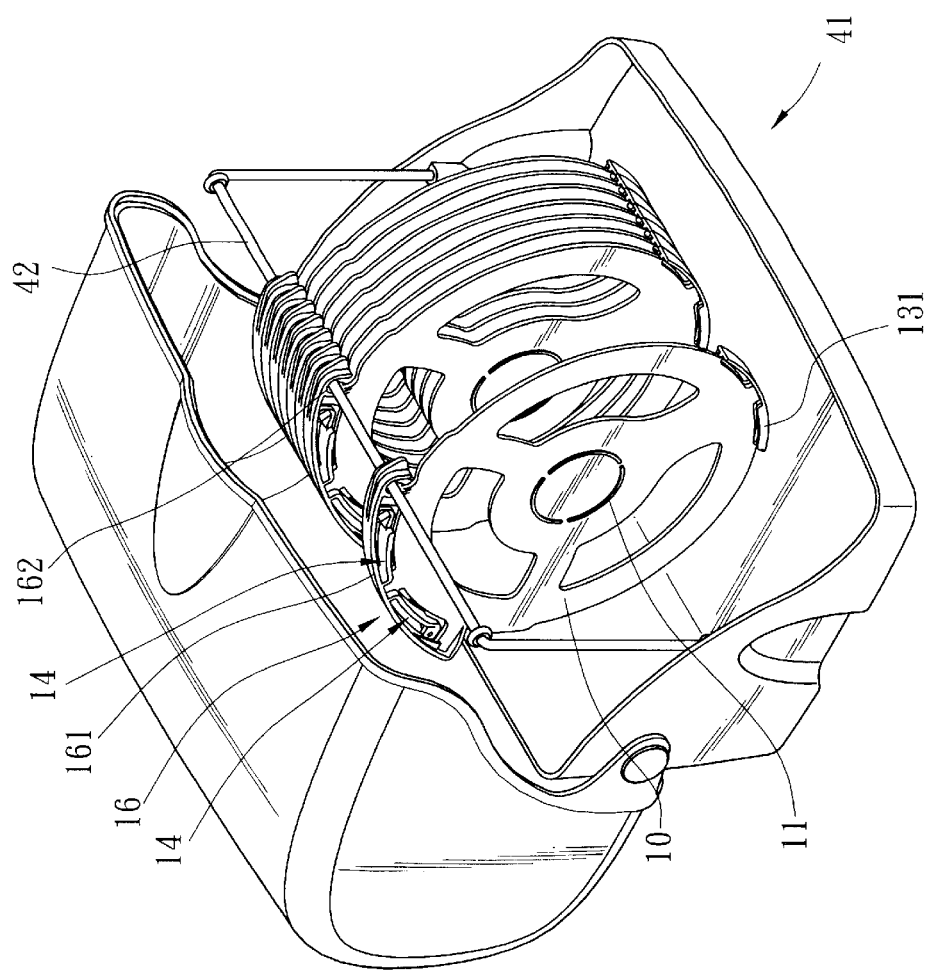
FIG. 7C is another schematic view of the fifth embodiment of the invention in use.

Refer to FIG. 7C for another example of the fifth embodiment in practical use. A chest 41 that may be selectively closed is provided to house the rod 42. It offers another type of hanging storage means for the CD 20.

Sixth Embodiment

Figure 8A:
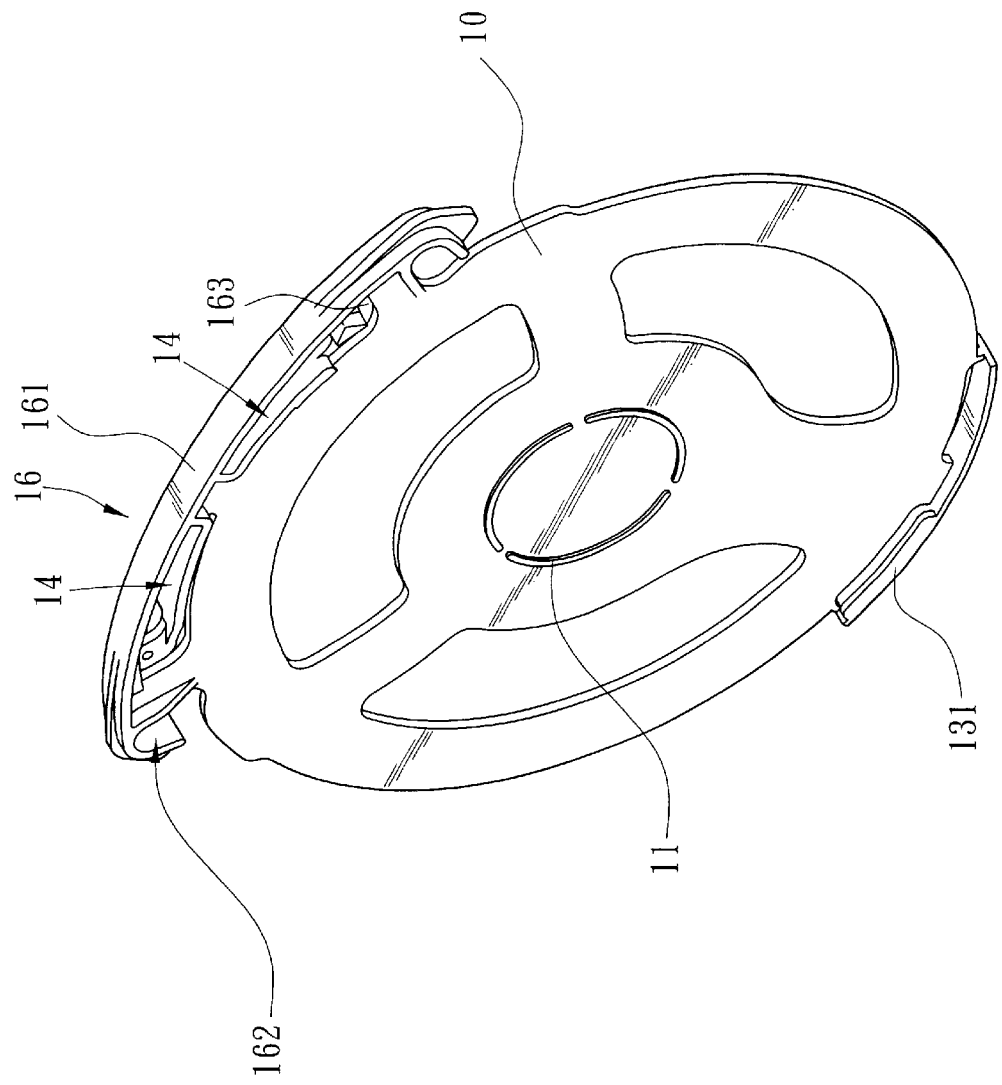
FIG. 8A is a perspective view of a sixth embodiment of the invention.
Figure 8B:
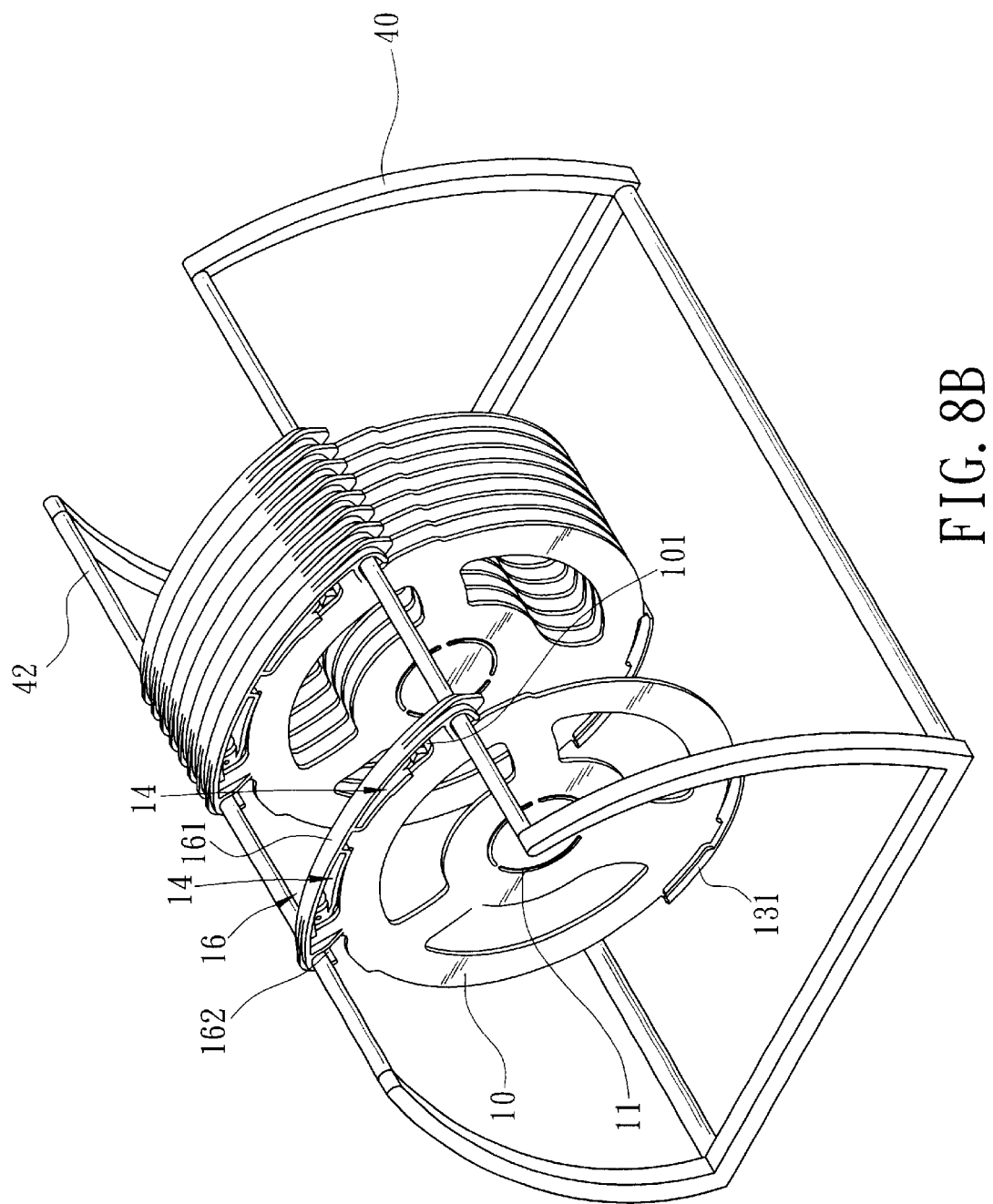
FIG. 8B is a schematic view of the sixth embodiment of the invention in use.
Figure 8C:
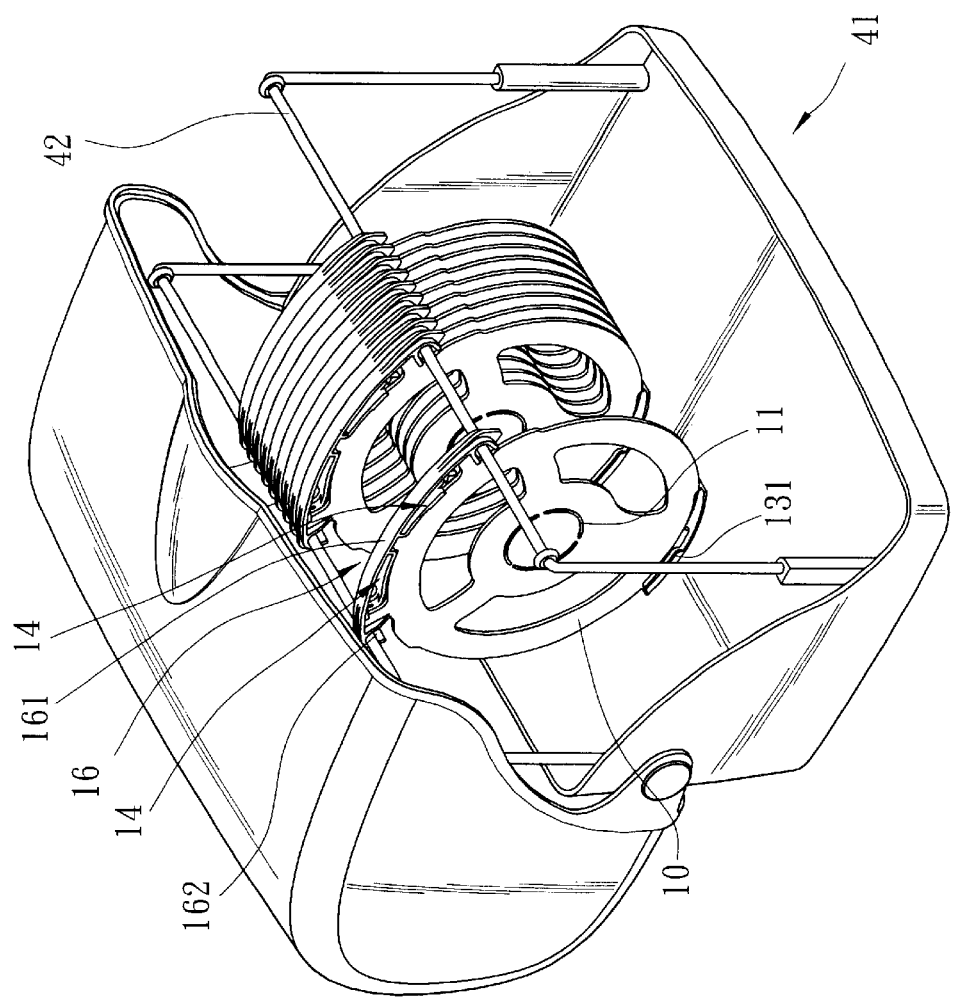
FIG. 8C is another schematic view of the sixth embodiment of the invention in use.

Refer to FIGS. 8A, 8B and 8C for a six embodiment of the invention. The fender 16 has two hooks 162 on the outer side, while the holding rack 40 and the chest 41 have two rods 42. Thus the holder body 10 may be hung horizontally on the two rods 42 through the hooks 162. It provides another hanging type.

Seventh Embodiment

Figure 9:
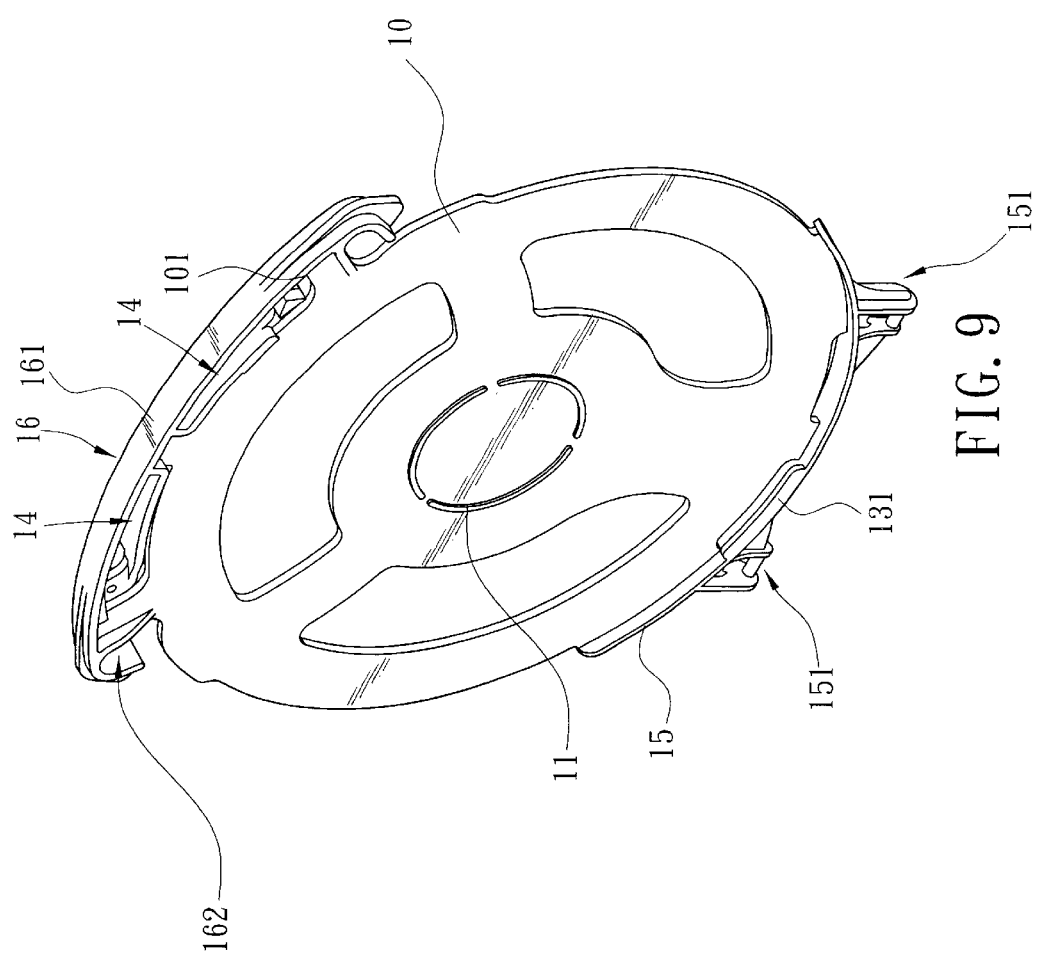
FIG. 9 is a perspective view of a seventh embodiment of the invention.

Refer to FIG. 9 for a seventh embodiment of the invention. There are coupling sections 151 located on the outer side of the side wall 13 of the holder body 10. The fender 16 has hooks 162 located on the outer side thereof. Adopting this embodiment, when users want to carry their CDs 20 outdoors, they can place the CDs 20 on the holder body 10 and couple the holder body 10 in a portable case 30 through the coupling sections 151 to facilitate carrying. When returned, the holder body 10 may be removed from the case 30 and hung on the holding rack 40 or in the chest 41 through the hooks 162. This is a novel CD holding and storing method.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A compact disc holder made in one piece by integrated forming for holding compact discs, comprising:

a holder body having a front planar side and a back planar side;

a side wall located on one side of the holder body and extended vertically from one planar side of the holder body at a selected elevation having a clip flange extending horizontally against the planar side towards the center of the holder body, the clip flange being spaced from the planar side of the holder body at a distance slightly greater than the thickness of the compact discs;

a cantilever arm located on another side of the holder body opposite to the clip flange having a connecting section connecting to the holder body and a suspending elastic section, the elastic section having a latch flap which extended horizontally against the planar side towards the center area of the holder body and spaced from the planar side of the holder body at an elevation slightly greater than the thickness of the compact discs, the latch flap and the clip flange forming a clipping position that has a clipping zone for clipping a compact disc in normal conditions, outwards horizontally relative to the planar side of the holder body to expand the clipping zone to form a release position to facilitate removing and mounting of the compact disc;

wherein the elastic section has an outer end forming a poking flap which allows a finger to move the elastic section horizontally.

2. The compact disc holder of claim 1, wherein the side wall of the holder body is extended outwards to form at least a coupling section, the coupling section having a notch and a latch bar, the coupling section being allowed to be movably coupled with a latch dock such that the holder body is movably mounted on the latch dock.

3. The compact disc holder of claim 2, wherein the latch dock is located in a case.

4. The compact disc holder of claim 1, wherein the side wall includes a plurality of sets.

5. The compact disc holder of claim 1, wherein the side wall has a plurality of clip flanges.

6. The compact disc holder of claim 1, wherein the cantilever arm has an outer side extending to form a fender, the fender and the cantilever being interposed by carved openings for limiting the movable range of the elastic section.

7. The compact disc holder of claim 1, wherein the planar side of the holder body has at least one bulged section located on the center thereof for spacing the compact disc from the planar side of the holder body at a selected distance.

8. The compact disc holder of claim 7, wherein the bulged section is a strip.

9. The compact disc holder of claim 7, wherein the bulged section is formed in dots.

10. The compact disc holder of claim 1, wherein the holder body is extended outwards from the clipping zone to form at least one hook for hanging the holder body on at least one rod.

11. The compact disc holder of claim 10, wherein the rod is located in a chest.

12. The compact disc holder of claim 10, wherein the rod is mounted onto a loading rack.

13. The compact disc holder of claim 1, wherein the side wall and the cantilever arm are formed respectively on the front planar side and the back planar side of the holder body and correspond to each other for holding one compact disc respectively on the front planar side and the back planar side.

* * * * *